US007117528B1

(12) United States Patent
Hyman et al.

(10) Patent No.: US 7,117,528 B1
(45) Date of Patent: Oct. 3, 2006

(54) CONTESTED ACCOUNT REGISTRATION

(75) Inventors: Robert M. Hyman, Sammamish, WA (US); Sachin Kukreja, Seattle, WA (US); Danpo Zhang, Issaquah, WA (US); Barry I. Kelman, Woodinville, WA (US); Munir Mahmood, Bellevue, WA (US); Elaine Lan Chen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 910 days.

(21) Appl. No.: 10/279,515

(22) Filed: Oct. 24, 2002

(51) Int. Cl.
*H04L 9/32* (2006.01)
*G06F 15/16* (2006.01)

(52) U.S. Cl. .............................. 726/5; 726/1; 709/206
(58) Field of Classification Search ................ None
See application file for complete search history.

(56) References Cited

U.S. PATENT DOCUMENTS

| 5,944,824 | A  | * | 8/1999  | He .................................. 726/6 |
| 5,948,064 | A  | * | 9/1999  | Bertram et al. ............. 709/225 |
| 6,006,331 | A  |   | 12/1999 | Chu et al. |
| 6,058,426 | A  |   | 5/2000  | Godwin et al. |
| 6,092,196 | A  | * | 7/2000  | Reiche ........................... 726/6 |
| 6,092,199 | A  | * | 7/2000  | Dutcher et al. ................ 726/4 |
| 6,260,148 | B1 |   | 7/2001  | Aggarwal et al. |
| 6,311,275 | B1 | * | 10/2001 | Jin et al. ....................... 726/12 |
| 6,367,009 | B1 |   | 4/2002  | Davis et al. |
| 6,701,362 | B1 | * | 3/2004  | Subramonian et al. ...... 709/224 |
| 6,973,481 | B1 | * | 12/2005 | MacIntosh et al. ......... 709/206 |
| 2001/0020228 | A1 |   | 9/2001  | Cantu et al. |
| 2002/0120864 | A1 | * | 8/2002  | Wu et al. .................... 713/201 |
| 2002/0194501 | A1 |   | 12/2002 | Wenocur et al. |
| 2003/0154403 | A1 | * | 8/2003  | Keinsley et al. ............ 713/201 |
| 2003/0233336 | A1 | * | 12/2003 | Clark ............................. 707/1 |
| 2004/0210776 | A1 | * | 10/2004 | Shah et al. .................. 713/202 |
| 2004/0230647 | A1 | * | 11/2004 | Rawat ......................... 709/203 |
| 2005/0076110 | A1 | * | 4/2005  | Mathew et al. ............. 709/223 |
| 2005/0108341 | A1 | * | 5/2005  | Mathew et al. ............. 709/206 |
| 2005/0114456 | A1 | * | 5/2005  | Mathew et al. ............. 709/206 |
| 2005/0216771 | A1 |   | 9/2005  | Malcolm |

OTHER PUBLICATIONS

"Microsoft.net Passport Review Guide", Jan. 2004, Microsoft, p. 1-35.*
Stubblebine et al., "Unlinkable Serial Transactions: Protocols and Applications," ACM Transactions on Information and System Security, Nov. 1999, pp. 354-389, vol. 2, Issue 4, ACM Press, New York, USA.
Lategan et al., "On Granting Limited Access to Private Information," The Tenth International World Wide Web Conference, 2001, pp. 21-25, ACM Press, New York, USA.
Bonatti et al., "Regulating Service Access and Information Release on the Web," Proceedings of the Seventh ACM Conference on Computer and Communications Security, 2000, pp. 134-143, ACM Press, New York, USA.

(Continued)

*Primary Examiner*—Christopher Revak
(74) *Attorney, Agent, or Firm*—Senniger Powers

(57) ABSTRACT

Methods and systems for resolving naming contests when a user seeks to register an account associated with a login identifier that is already in use by another user. An authentication server notifies the user of a contested registration when the requested login identifier, such as an e-mail address, matches one of the identifiers stored in an authentication database. The server then solicits confirmation from the user that the login identifier belongs to the requesting user rather than the earlier user. By forcing the earlier user to select a different login identifier, the server renders the existing user account inactive but retains a unique account identifier and associated account information for the inactive user account.

45 Claims, 7 Drawing Sheets

OTHER PUBLICATIONS

Horne et al., "Escrow Services and Incentives in Peer-to-Peer Networks," Proceedings of the Third ACM Conference on Electronic Commerce, 2001, pp. 85-94, ACM Press, New York, USA.

Aguilera et al., "Matching Events in a Content-Based Subscription System," Proceedings of the Eighteenth Annual ACM Symposium on Principles of Distributed Computing,1999, pp. 53-61, ACM Press, New York, USA.

Carzaniga et al., "Design and Evaluation of a Wide-Area Event Notification Service," ACM Transactions on Computer Systems (TOCS), vol. 19, Issue 3, Aug. 2001, pp. 332-383, ACM Press, New York, USA.

Kendall et al., "Information Delivery Systems: An Exploration of Web Pull and Push Technologies," Communications of the AIS, vol. 1, Issue 4es, Apr./May 1999, 43 pages, Association for Information Systems, Georgia, USA.

* cited by examiner

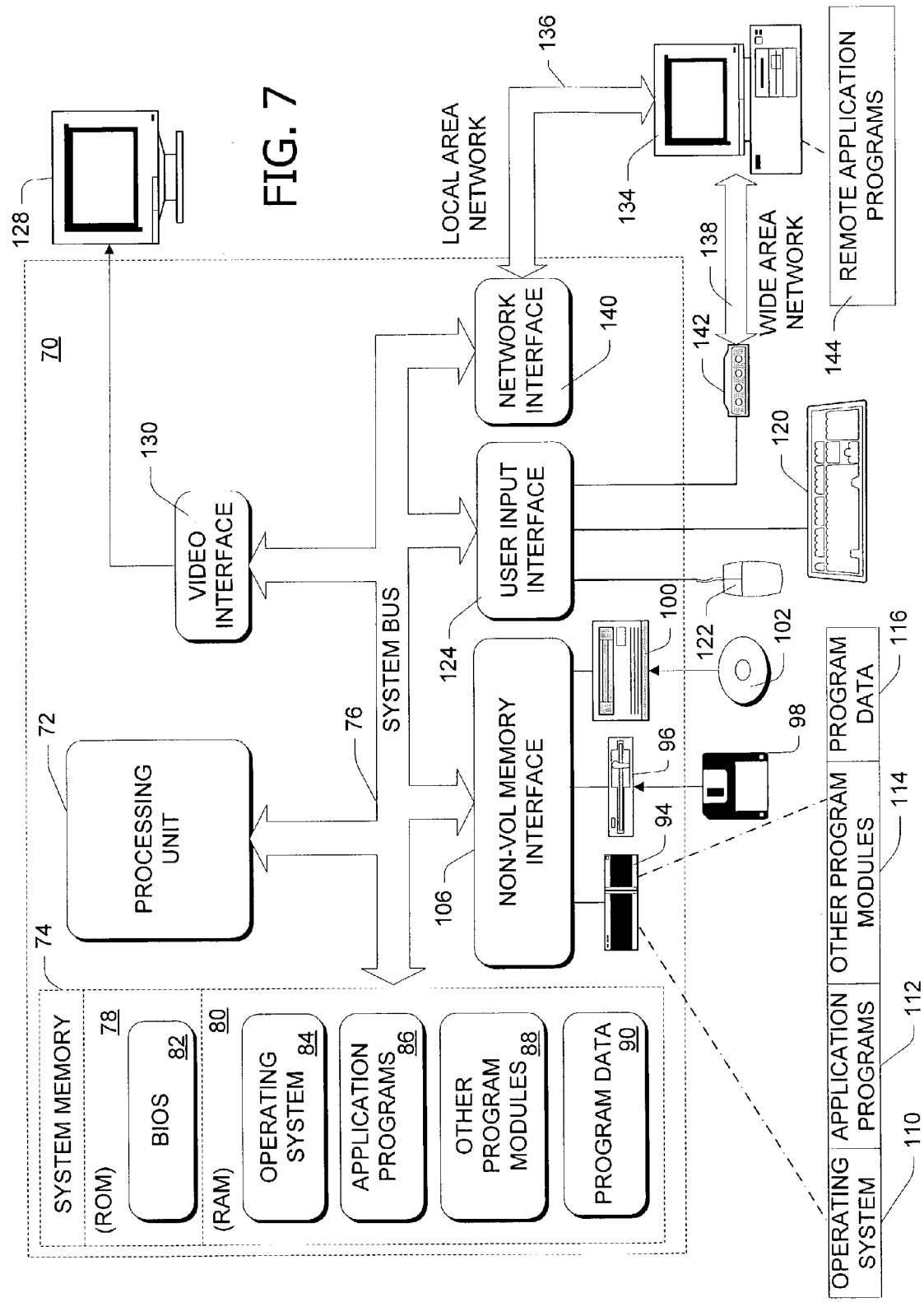

CONTESTED ACCOUNT REGISTRATION

NOTICE

Copyright 2002 Microsoft Corporation. All rights reserved. A portion of the disclosure of the patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present invention relates to the field of computer network environments. In particular, this invention relates to conflict resolution in a multi-site authentication system and enhanced user experience in such a system.

BACKGROUND OF THE INVENTION

Web sites, or Internet sites, very often provide information, products, services, and the like to their users. Many web sites require users to "register" before their web servers will grant access to the users. During registration, a user typically supplies personal information such as username, account number, address, telephone number, e-mail address, computer platform, age, gender, and/or hobbies to the registering web site. The registration information may be necessary to complete transactions (e.g., commercial or financial transactions). Typically, the information also permits the web site to contact the user directly (e.g., via electronic mail) to announce, for example, special promotions, new products, or new web site features. Additionally, web sites often collect user information so web site operators can better target future marketing activities or adjust the content provided by the sites.

When registering a user for the first time, a web site typically requests that the user select a login identifier, or login ID, and an associated password. The login ID allows the web site to identify the user and retrieve information about the user during subsequent user visits to the web site. Generally, the login ID must be unique to the web site such that no two users have the same login ID. The combination of the login ID and password associated with the login ID allows the web site to authenticate the user during subsequent visits to the web site. The password also prevents others (who do not know the password) from accessing the web site using the user's login ID. This password protection is particularly important if the web site stores private or confidential information about the user, such as financial information or medical records.

If the user visits several different web sites, each web site may require entry of similar registration information about the user, such as the user's name, mailing address, and e-mail address. This repeated entry of identical data is tedious when visiting multiple web sites in a short period of time. Many web sites require the user to register before accessing any information provided on the site. Thus, the user must first enter the requested registration information before he or she can determine whether the site contains any information of interest.

After registering with multiple web sites, the user must remember the specific login ID and password used with each web site or other Internet service. Without the correct login ID and password, the user must re-enter the registration information. A particular user is likely to have different login IDs and associated passwords on different web sites. For example, a user named Bob Smith may select "smith" as his login ID for a particular site. If the site already has a user with a login ID of "smith" or requires a login ID of at least six characters, then the user must select a different login ID. After registering at numerous web sites, Bob Smith may have a collection of different login IDs, such as: smith, smith1, bsmith, smithb, bobsmith, bob_smith, and smithbob. Further, different passwords may be associated with different login IDs due to differing password requirements of the different web sites (e.g., password length requirements or a requirement that each password include at least one numeric character and/or at least one uppercase character). Thus, Bob Smith must maintain a list of web sites, login IDs, and associated passwords for all sites that he visits regularly.

Using a presently available multi-site user authentication system (e.g., Microsoft®.NET™ Passport single sign-in service), a web user can maintain a single login ID (and associated password) for accessing multiple, affiliated web servers or services. Such a system permits the user to establish a unique account identified by an e-mail address. An EASI (E-mail As Sign-In) account allows the user to use an existing e-mail address as a login ID, or sign-in name (e.g., Jane@e.com) while supplying all of the other attributes used to create an account. Note that the user can specify different passwords for the authentication system account and the e-mail account. In general, only the e-mail sign-in name needs to be common between the accounts. Contrary to a non-EASI account, a third party or otherwise unaffiliated e-mail provider hosts the user's e-mail service.

Notwithstanding the benefits of such a system, allowing users to use any e-mail address that is not hosted within the authentication system creates a problem. A user can create an authentication account using an e-mail address that he or she does not own. For example, Jane owns an e-mail account at Jane@e.com. However, when she signed up for an account with the multi-site authentication system, she registered a different sign-in name (e.g., Harry@e.com). In this example, Harry will not be allowed to use Harry@e.com as his sign-in name even if he properly owns the e-mail address because someone else, namely, Jane, has already taken the sign-in name. Moreover, Harry may receive e-mails from various affiliated web sites intended for Jane because she signed into the sites using Harry's e-mail address.

The problem is compounded when the original owner of the e-mail address (i.e., Harry in the example) attempts to register for an account. The service notifies the user that the selected sign-in identity (i.e., the e-mail address) is already in use by another user. The owner of the e-mail address is then forced to register with a different e-mail address (either by obtaining a different e-mail account or by registering under a false e-mail address), which creates additional problems.

For these reasons, improved conflict resolution is desired for authentication systems and the like to reduce operational errors and improve user registration experience.

SUMMARY OF THE INVENTION

The invention meets the above needs and overcomes one or more deficiencies in the prior art by providing improved account registration. Advantageously, the invention permits users to establish accounts with a multi-site authentication service or the like and to sign in using their own e-mail addresses. This enhances user satisfaction in the system. In addition, the invention allocates a new account to resolve any naming conflicts, or "contests," involving existing accounts. One aspect of the invention relates to allowing users to retain their unique account identifiers even though the sign-in names are subject to naming contests. Moreover, the features of the present invention described herein are less laborious and easier to implement than currently available techniques as well as being economically feasible and commercially practical.

Briefly described, a method of registering users in an authentication system embodies aspects of the invention. The authentication system includes an authentication server and an authentication database associated with the server. The server, which is coupled to a data communication network, authenticates registered users when login information retrieved from the registered users via the data communication network matches authentication credentials maintained in the authentication database. The credentials include login identifiers corresponding to user accounts of the registered users. In this instance, the user accounts are each assigned a unique account identifier. The method begins by receiving a request to create a new user account in connection with a requested login identifier. The server receives the request from a new user via a client computer also coupled to the data communication network. The method also includes notifying the new user of a contested registration when the requested login identifier matches one of the login identifiers maintained in the authentication database. The method continues with creating the new user account in connection with the requested login identifier and rendering inactive the user account corresponding to the matching login identifier. This resolves the contested registration. Further, the method sets forth retaining the unique account identifier and associated account information for the inactive user account.

In another embodiment of the invention, an authentication system has an authentication server coupled to a data communication network and an authentication database associated with the authentication server. The server is configured to authenticate registered users when login information from the registered users retrieved via the data communication network matches authentication credentials maintained in the authentication database. The credentials include login identifiers corresponding to user accounts of the registered users. In this instance, the user accounts are each assigned a unique account identifier. The server is also configured to receive a request to create a new user account in connection with a requested login identifier. In this instance, the authentication server receives the request from a new user via a client computer also coupled to the data communication network. Further the server is configured to notify the new user of a contested registration when the requested login identifier matches one of the login identifiers maintained in the database, create the new user account in connection with the requested login identifier for the new user, render inactive the user account corresponding to the matching login identifier for resolving the contested registration, and retain the unique account identifier and associated account information for the inactive user account.

Yet another embodiment of the invention is directed to a method of managing user accounts in an authentication system. The system has an authentication server coupled to a data communication network and an authentication database associated with server. The server authenticates users when it retrieves login information that matches authentication credentials maintained in the authentication database. The credentials include e-mail addresses corresponding to the user accounts of the users. In this instance, the user accounts are each assigned a unique account identifier. The method begins when the server receives a request from one of the users to change the e-mail address associated with the user account of the requesting user. After receiving the request, the method solicits confirmation from the requesting user that the requested e-mail address belongs to the requesting user when the requested e-mail address matches one of the e-mail addresses maintained in the authentication database. The server solicits the confirmation via an e-mail sent to the requested e-mail address. The method further includes rendering inactive the user account corresponding to the matching e-mail address and retaining the unique account identifier and associated account information for the inactive user account.

In yet another embodiment, a method of managing user accounts in an authentication system includes receiving, at an authentication server, a request from a user to associate an e-mail address with the user account of the requesting user. Continuing, the method sets forth notifying the requesting user of a contested registration when the requested e-mail address matches one of the e-mail addresses stored in an authentication database associated with the server. The method also includes soliciting confirmation from the requesting user that the requested e-mail address belongs to the requesting user and placing the user account corresponding to the matching e-mail address in a forced rename state. The forced rename state renders the user account inactive and causes the user of the inactive user account to change the matching e-mail address associated with the account before permitting the inactive user account to become active again. The method also sets forth retaining a unique account identifier and associated account information for the inactive user account.

Alternatively, the invention may comprise various other methods and apparatuses.

Other features will be in part apparent and in part pointed out hereinafter.

BRIEF DESCRIPTION OF THE DRAWINGS

FIG. 7 is a block diagram illustrating components of a computer for use in the system of FIG. 1.

Corresponding reference characters indicate corresponding parts throughout the drawings.

DETAILED DESCRIPTION OF THE INVENTION

Figure 1:
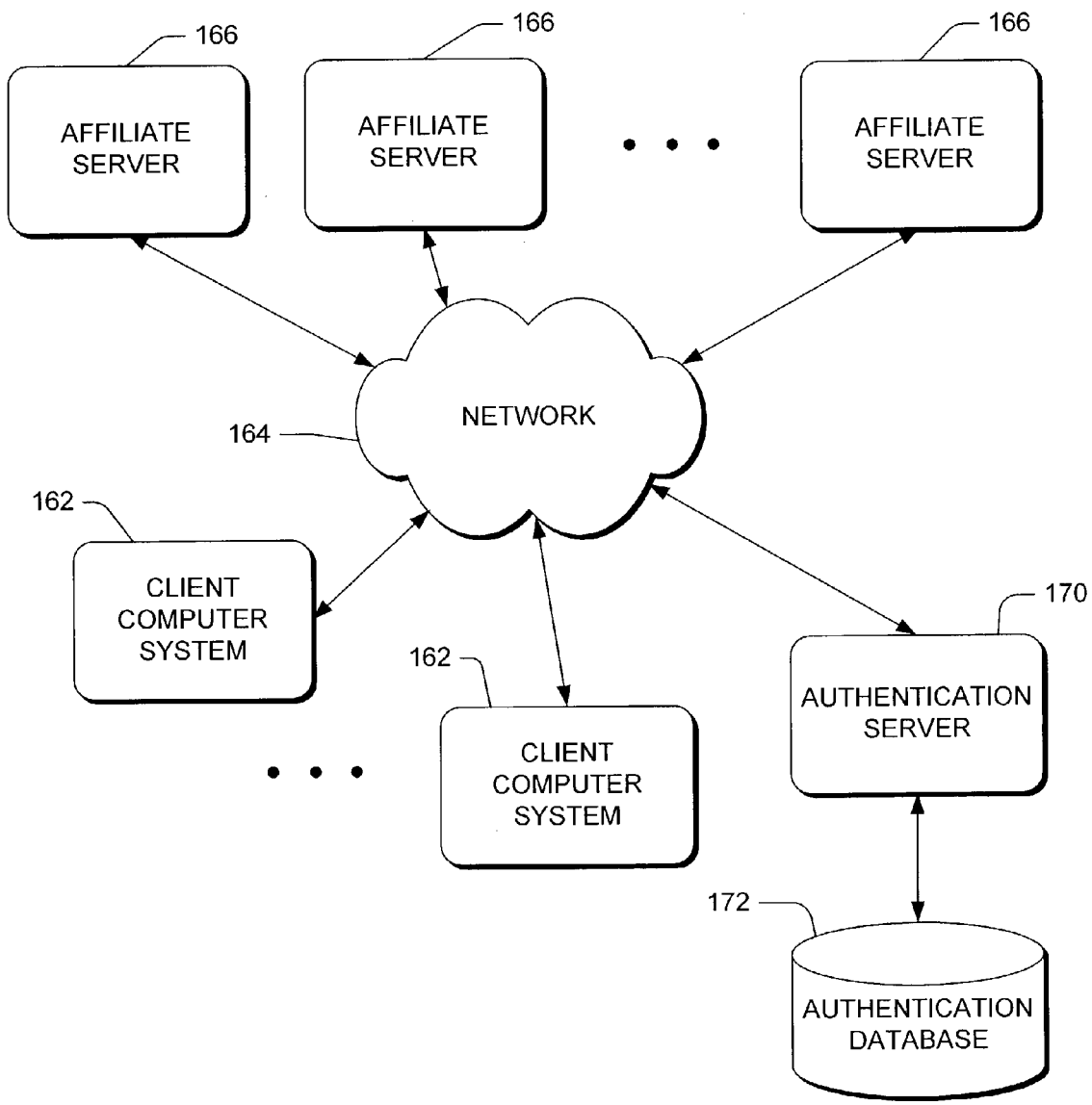
FIG. 1 is a block diagram illustrating an exemplary network environment in which the present invention is utilized.

Referring now to the drawings, FIG. 1 illustrates an exemplary network environment in which the present invention is utilized. The invention relates to cross-internet collaboration between web sites as part of a distributed, multi-site user authentication system (e.g., Microsoft®.NET™ Passport sign on service). Such services provide a user with the ability to access one or more participating Web sites or resources with a single sign-in. Although the participating, or affiliate, sites still maintain control over permissions, they use the authentication service rather than hosting and maintaining their own proprietary authentication systems. According to one embodiment, the invention permits a new account to be allocated (automatically or with human assistance) even though there is a naming conflict, or contest, with an existing account. To do so, the user seeking to register the new account must demonstrate that he or she is the current owner of the contested sign-in name before the existing account will be modified. The new credential can be used immediately and the preexisting account is rendered temporarily useless, pending choice of a new, non-conflicting name by its owner.

In FIG. 1, one or more client computer systems 162 are coupled to a data communication network 164. In this example, the network 164 is the Internet (or the World Wide Web). However, the teachings of the present invention can be applied to any data communication network. Multiple affiliate servers 166 are also coupled to network 164. In turn, the client computer systems 162 can access the affiliate servers 166 via network 164. Affiliate servers 166 are also referred to as "web servers" or "network servers."

An authentication server 170 coupled to network 164 allows communication between itself and client computer systems 162 and web servers 166. Although referred to as an "authentication server," authentication server 170 in the illustrated embodiment is also a web server capable of interacting with web browsers and other web servers. In this example, authentication server 170, client computer systems 162, and web servers 166 communicate data among themselves using the hypertext transfer protocol (HTTP), a protocol commonly used on the Internet to exchange information. An authentication database 172 is coupled to authentication server 170. The authentication database 172 contains information (i.e., credentials) necessary to authenticate a user of one of the client computer systems 162 (as well as other users on the network) and also identifies which elements of the user profile information should be provided to a particular affiliate server 166 when the user accesses the affiliate server. In general, a credential is a means for generating an authenticated reference to a single account identifier. For example, an EASI sign-in name and password, a mobile phone number and PIN, and a biometric signature are all credentials that can be associated with the same profile data.

Although authentication database 172 is shown separately from authentication server 170, it is to be understood that in other embodiments of the invention, authentication database 172 may be contained within authentication server 170. In a federated environment, for example, a plurality of authentication servers 170 may be used to provide authentication.

The authentication server 170, as described herein, authenticates a user of client computer 162 seeking access to a particular one of the affiliate servers 166. Authentication server 170 first requests authenticating login information from the user, such as the user's login ID and password. If the user is successfully authenticated, authentication server 170 routes the user's client computer 162 to the appropriate affiliate server 166 for performing a desired service for the user.

As part of the user authentication process, authentication server 170 may provide certain user profile information to affiliate server 166, such as the user's e-mail address, user preferences, and the type of Internet browser installed on client computer 162. This user profile information is associated with the user's login ID so that each time the user logs into a particular affiliate server 166, the associated user profile information is available to the affiliate server. This user profile allows the user to enter the information once and use that information during subsequent logins to new affiliate servers. By maintaining user profile information, the authentication system of the invention is able to share pertinent information with the affiliate sites to speed registration and enable access to personalized accounts or services.

In one embodiment, an "affiliate server" is a web server that has "registered" or otherwise established a relationship or affiliation with authentication server 170. Each affiliate server 166 includes a code sequence (not shown) that allows the affiliate server to communicate with authentication server 170 when a user (who is also registered with authentication server 170) requests access to affiliate server 166. Additional details regarding the authentication process and the interaction between client computer 162, affiliate servers 166, and authentication server 170 are provided below.

Prior to executing the authentication process described below, both the user of client computer system 162 and the operator(s) of affiliate servers 166 "register" with authentication server 170. This registration is a one-time process that provides necessary information to the authentication server. The user of client computer system 162 registers with authentication server 170 by providing information about the user and/or client computer system 162, such as, the user's name, mailing address, and e-mail address. As part of the user registration process, the user is assigned (or selects) a login ID, which is a common login ID, used to access any affiliate server (e.g., server 166, 18, 20). The login ID may also be referred to herein as a "username," "member name," or "login name". As described above, multi-site user authentication systems of the type described herein permit the user to establish a unique account identified by an e-mail address. An EASI (E-mail As Sign-In) account allows the user to use an existing e-mail address as a login ID, or sign-in name (e.g., Jane@e.com) while supplying all of the other attributes used to create an account.

Additionally, the user selects a password associated with the login ID that is used for authentication purposes. After registering and logging into authentication server 170, the user can visit any affiliate server 166 (i.e., affiliate servers that are also registered with the same authentication server) without requiring any additional authentication and without re-entering user information that is already contained in the associated user profile. The present invention sets forth identifying the user account, or profile, by a unique account identifier.

The operator(s) of affiliate servers 166 register with authentication server 170 by providing information about the affiliate server (e.g., server name and Internet address). Additionally, each affiliate server 166 provides information regarding its authentication requirements. The requirements for authentication may be specified in terms of a maximum time allowed since the last login and entry of authentication information by the user. These requirements may also be specified by the maximum time allowed since the last "refresh" of the authentication information by the user. After registering with authentication server 170, affiliate servers 166 can use the authentication server to authenticate any user that has also registered with the authentication server.

The authentication server 170 validates the username/password provided by the user. Authentication server 170 handles the authentication response by comparing the login data to the entries in authentication database 172. If the username and password match an entry in the database 172, the user is authenticated. A unique identifier (e.g., Passport Unique Identifier (PUID)) and a user profile corresponding to the authenticated user are extracted from the database. In this embodiment, when a user registers an account, the account is assigned a PUID that becomes the unique identifier for the account. The PUID is, for example, a 64-bit number that is sent (encrypted) to affiliate site 166 as the authentication credential when the user signs in.

Figure 2:
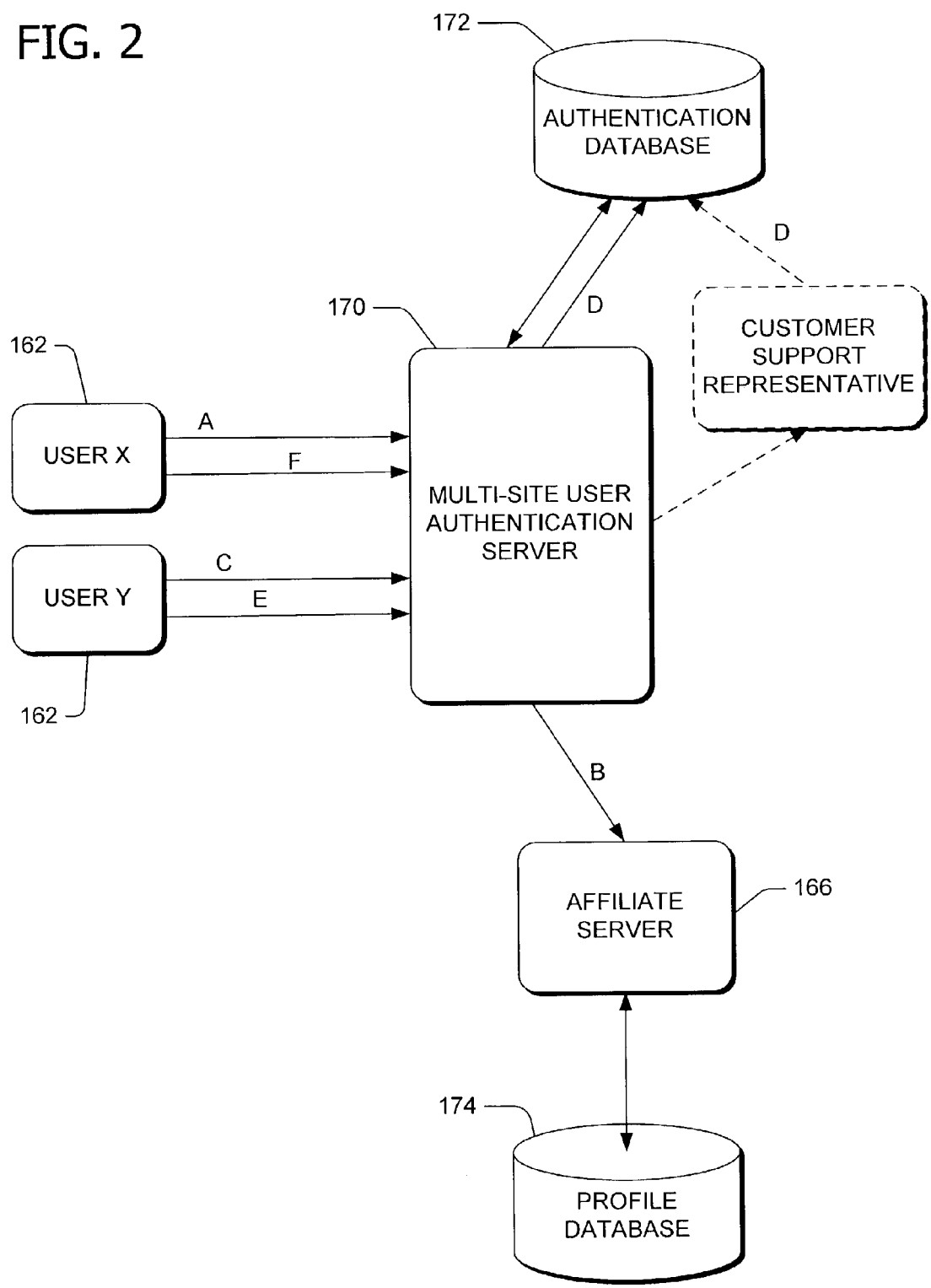
FIG. 2 is a block diagram illustrating an exemplary interaction between client computers, at least one affiliate server, and an authentication server of FIG. 1 when users of the client computers register with the authentication server.

FIG. 2 is an exemplary flow diagram illustrating an implementation of the present invention and the interaction between multiple client computer systems 162, at least one affiliate server 166, and authentication server 170 when users seek to establish accounts with the authentication server. The illustrated example of FIG. 2 describes the situation in which the user of client computer system 162 has not yet logged into affiliate server 166 and has not yet been registered or authenticated by authentication server 170. The lines in FIG. 2 labeled "A" through "F" represent the flow of information or activities during the registration process. The arrows on the lines indicate the direction of the process flow. The label "A" represents the beginning of the processes and the label "F" represents the end of the process.

In the exemplary process flow of FIG. 2, a first user of client computer system 162, User X, begins by registering with authentication server 170. In this instance, User X creates a user account based on, for example, an e-mail address as the login ID (username Harry@e.com: PW1→PUID1). (See A). User X proceeds to login to the web site of affiliate server 166 as Harry@e.com. In turn, affiliate server 166 obtains user-specific information regarding User X and stores the information in a profile database 174 in the form of a user profile associated with User X's account. (See B). The profile database 174 stores the user-specific profile data in this embodiment with reference to PUID1, the unique identifier of User X's account.

Referring further to FIG. 2, another user, User Y, eventually seeks to register with authentication server 170 using an e-mail address as his sign-in. (See C). If User Y requests a new account in connection with Harry@e.com, server 170 will issue an error message because the particular EASI account has already been created. In response, authentication server 170 initiates a resolution process, i.e., a credentials contest. (See D). In this embodiment, a "contested sign-in" or "contest" refers to when one person owns a particular sign-in name or login ID that is associated with an existing EASI account while another person owns the-mail account having the same sign-in name.

When User Y (who actually owns the e-mail address Harry@e.com) tries to create a user account in connection with this particular login ID, server 170 generates a user interface notifying User Y that the account is already taken. In one embodiment, authentication server 170 also presents User Y with an invitation to continue registration (e.g., by way of a hyperlink to a registration form) if the requested sign-in name is his e-mail address. A customer support representative (CSR), for example, begins the credentials contest in response to a request for help with the registration. In order to determine whether User Y truly owns the requested e-mail address, the CSR sends an e-mail message to Harry@e.com asking User Y to confirm that he or she is in fact the owner of the requested e-mail address.

In response to an affirmative reply from User Y, the CSR places User X's existing account associated with Harry@e.com in a "ForceRename" state (username Harry@e.com: PW1→PUID1, ForceRename). This means that the next time User X signs in to her account, authentication server 170 informs her that someone else owns the login ID for her account. Under these circumstances, authentication server 170 requires User X to change her sign-in name before she is allowed to carry on fully using the account. The user who contested the sign-in name successfully proves his or her precedence by responding to the e-mail message. In the ForceRename state, the credential can no longer be used to start new sessions at affiliate sites. If an account has multiple credentials, the other one(s) can be used to start new sessions. When the owner completes the process of changing the sign-in name, the account returns to an allocated state (under the new sign-in). Any sessions started before the account entered the ForceRename state are not disrupted on transition into this state.

Advantageously, the present invention retains all of User X's account information even if she changes her login ID for the account. This is because the unique identifier (e.g., PUID) for the account remains the same and only the sign-in name changes. Thus, affiliate server 166 can still recognize User X as the same person at her next visit to the site.

The ForceRename state renders User X's account inactive (i.e., not blocking registration), which permits User Y to now register a user account with the requested sign-in name (username Harry@e.com: PW2→PUID2). (See E). When User Y registers, two accounts have the same sign-in name associated therewith. User Y's account is considered active and can be used immediately. On the other hand, User X's account is in the ForceRename state and, thus, User X cannot use her account until she has changed her sign-in name to something other than Harry@e.com.

According to the invention, authentication server 170 differentiates between the two accounts by checking that they have dissimilar passwords. In fact, User Y is not allowed to create an account with a password that is similar to User X's password. If the passwords were identical, the system would have no way of determining who is trying to sign-in. Moreover, if the passwords were even similar, User Y might be able to determine User X's password. Once User X changes her sign-in name, the account will come out of the ForceRename state and she will be able to use it normally (username Harry@e.com, rename, Frank@e.com: PW1→PUID1). (See F).

The present invention calls for two users to exist in the database with identical sign-in names. The way the system differentiates between the two accounts is by comparing passwords. Therefore, for a given sign-in name, if there is an existing account (active or inactive), when a second account is created, the second account holder's password will need to meet the following restrictions: a) the password cannot be the same length as the first account's password; and b) the first and last characters of the passwords cannot match. Various other implementations are also contemplated for defining whether two passwords are dissimilar.

It is to be understood that the customer support functions can be automated. For example, when User Y clicks on the link that invites him to register using his e-mail address, authentication server 170 automatically generates an e-mail message to Harry@e.com rather than the request being funneled to the CSR. In one embodiment, the e-mail contains a link to a registration page for the authentication system. The sign-in name may be pre-filled on the form. By completing and submitting the form, User Y creates an account with the login ID Harry@e.com and causes User X's account to be placed in the ForceRename state. It is important to note that both actions happen substantially simultaneously.

Figure 3:
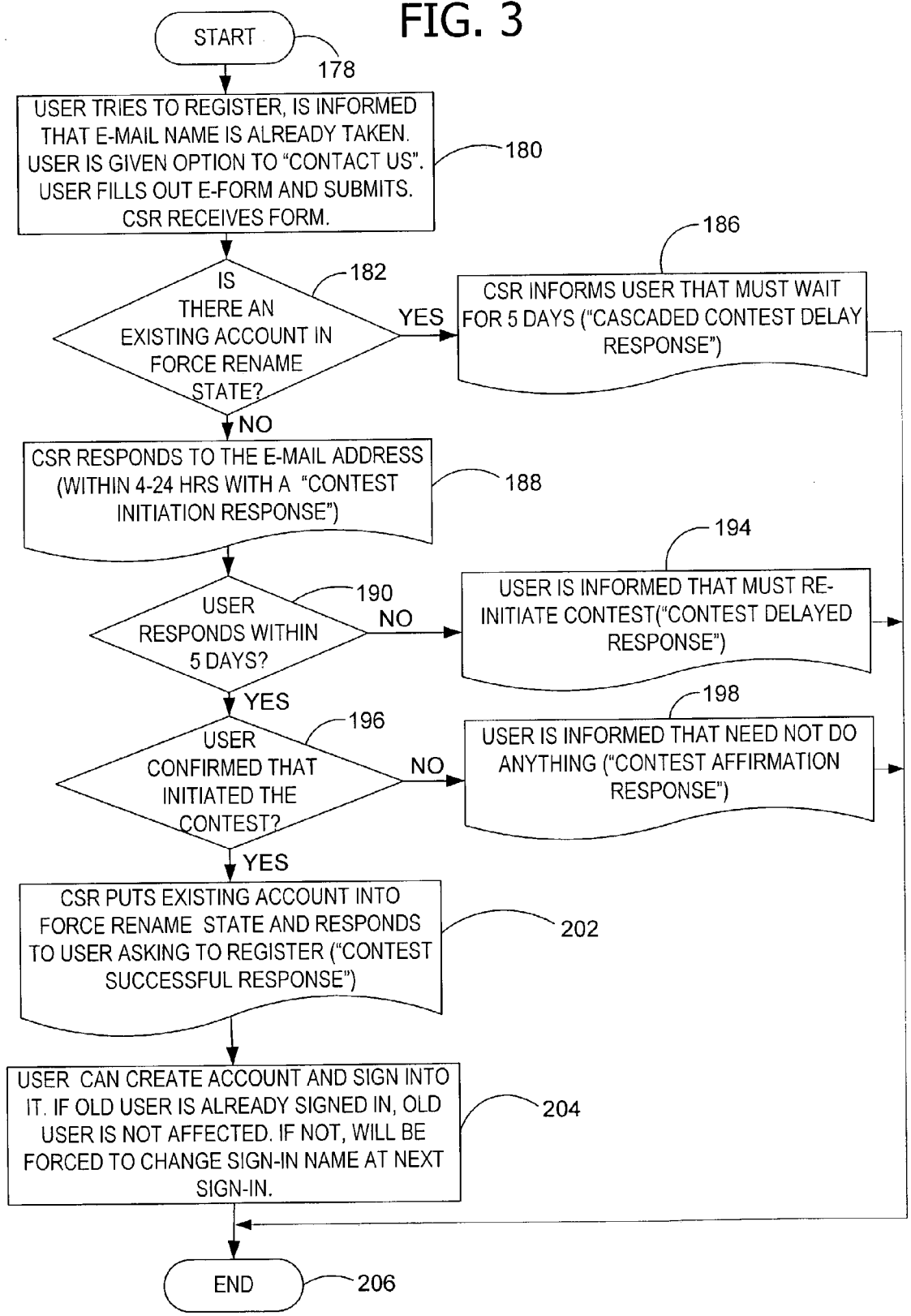
FIG. 3 is an exemplary flow diagram illustrating user action flow according to one embodiment of the invention.

Referring now to FIG. 3, an exemplary flow diagram illustrates user action flow according to one embodiment of the invention. After beginning at 178, operations proceed to 180 where the user attempts to register but is informed that the requested e-mail name is already taken. The invention gives the user the option to "contact us." At 180, the user submits an electronic form to the CSR requesting help in registering the user's account. At 182, the authentication system determines whether an existing account is in ForceRename state. In one embodiment of the invention, the CSR informs the user at 186 that he or she must wait for five days if an existing account is in the ForceRename state. Otherwise, operations proceed to 188 at which the CSR responds to the e-mail address (e.g., within 4–24 hours to initiate the credentials contest). If the user does not respond within five days, as determined at 190, the authentication system delays the contest.

As noted above in connection with FIG. 3, the CSR responds to the user's request (e.g., within four hours if the request is in English and within 24 hours if the request is in another language). In this example, the user has five days to respond to the e-mail that the CSR sends. If the user does not reply to the e-mail within five days, the authentication system assumes that the contest is aborted. If a user responds after five days, the CSR will respond with an e-mail stating that the user must re-start the contest.

At 194, the user is informed that he or she must re-initiate contest. On the other hand, the process flow continues at 196 to determine if the user confirmed initiating the contest. If not, the user need not do anything at 198. The CSR puts the existing account into the ForceRename state at 202 if the user initiated the credentials contest. At 202, the CSR also responds to the user asking him or her to register the account. The user can create the account and login to it at 204. If a pre-existing user is already signed in, he or she is not affected but will be forced to change the sign-in name the next time. User action flow ends at 206.

The invention works on the principal of "positive acknowledgements". This means that actions/processes will not be completed unless there is positive acknowledgment on part of both parties (CSR and user). This applies to at least the following situation: If a user initiates a contest and an e-mail is generated to the user, unless the user replies to the mail positively confirming that he/she wants to go ahead with the contest, the contest will not proceed.

APPENDIX A provides specific examples of the contested credential process.

In one embodiment of the invention, users have the ability to initiate a re-claim process from three entry points. First, after an unsuccessful attempt to register (if the sign-in name is already taken), the user is given the option to re-claim the account in question. The system display a page to the user informing him or her that the account name is already taken. There is a link on this page (e.g., "Allow me to re-claim this sign-in name") to direct the user another page explaining that someone may have already registered with the requested e-mail address. In order to register with the same e-mail address, the user will have to go through a "re-claim" process. The authentication system asks the user to click on a link to initiate the process. If the user chooses to proceed, he or she will receive an e-mail message with information about contesting the account in question. An interstitial page warns the user to not proceed if the user does not wish to initiate the contest. If the user elects to continue, a registration page with the same cobranding experience as the original registration page pre-fills the sign-in name in an un-editable format. If the user completes the registration, the new account is created and the old account is put into a ForceRename state.

Figure 4:
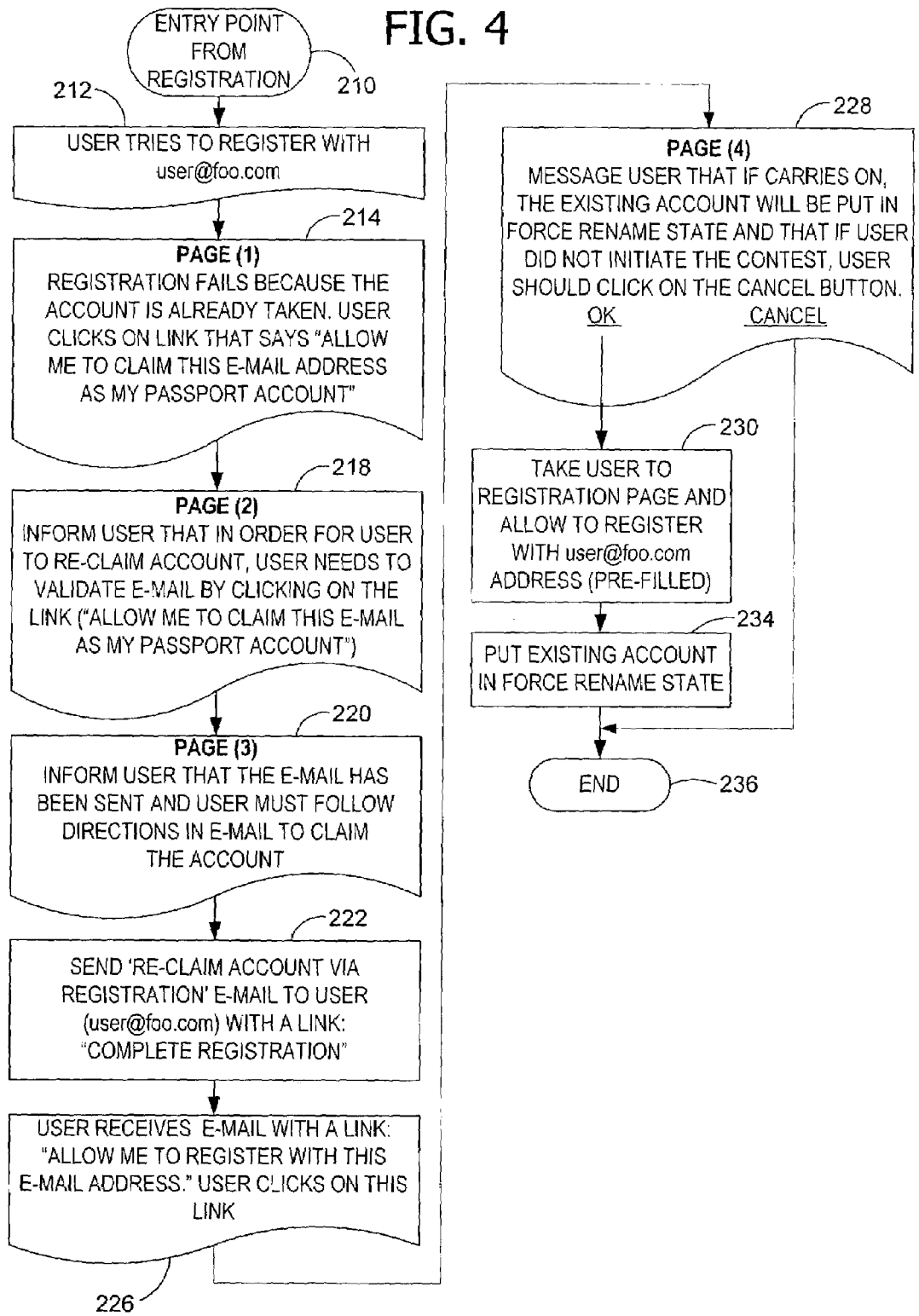
FIG. 4 is an exemplary flow diagram illustrating registration flow according to one embodiment of the invention.

FIG. 4 is an exemplary flow diagram illustrating registration flow according to one embodiment of the invention. Reference character 210 indicates an entry point from registration. At 212, the user attempts to register with an e-mail as sign-in, for example, user@f.com. The process at 214 presents the user with a link to "Allow me to claim this e-mail address as my account" when registration fails because the account is already taken. At 218 and 220, respectively, the authentication system informs the user that in order to re-claim the account, the user must first validate his or her e-mail address and then informs the user of the process for re-claiming the "hijacked" e-mail name. Proceeding to 222, the invention calls for an e-mail to be sent to the requested e-mail address to "re-claim account via registration." At 226, the user receives the e-mail with a link to allow registration. The process at 228 involves notifying the user that continuing registration will cause the existing account to be placed in a ForceRename state. The process at 230 takes the user to the registration page and allows the user to register with the user@f.com address (pre-filled). At 234, the existing account is placed in the ForceRename state. Operations end at 236.

The user can also enter the re-claim process after an un-successful attempt to change sign-in name. If the user tries to change his or her sign-in name and finds that it is taken, the system shows the user a link (e.g., "Allow me to re-claim this sign-in name") to a page explaining how the re-claim process works. In order to initiate the process, the user must click on a link to generate an e-mail message to the sign-in name in question. The contents of this e-mail are similar to the one described above with respect to registration. An interstitial page in turn leads the user to the change sign-in name page with the new sign-in name pre-filled and un-editable. If the user completes the change sign-in name, the old account is put in the ForceRename state.

Figure 5:
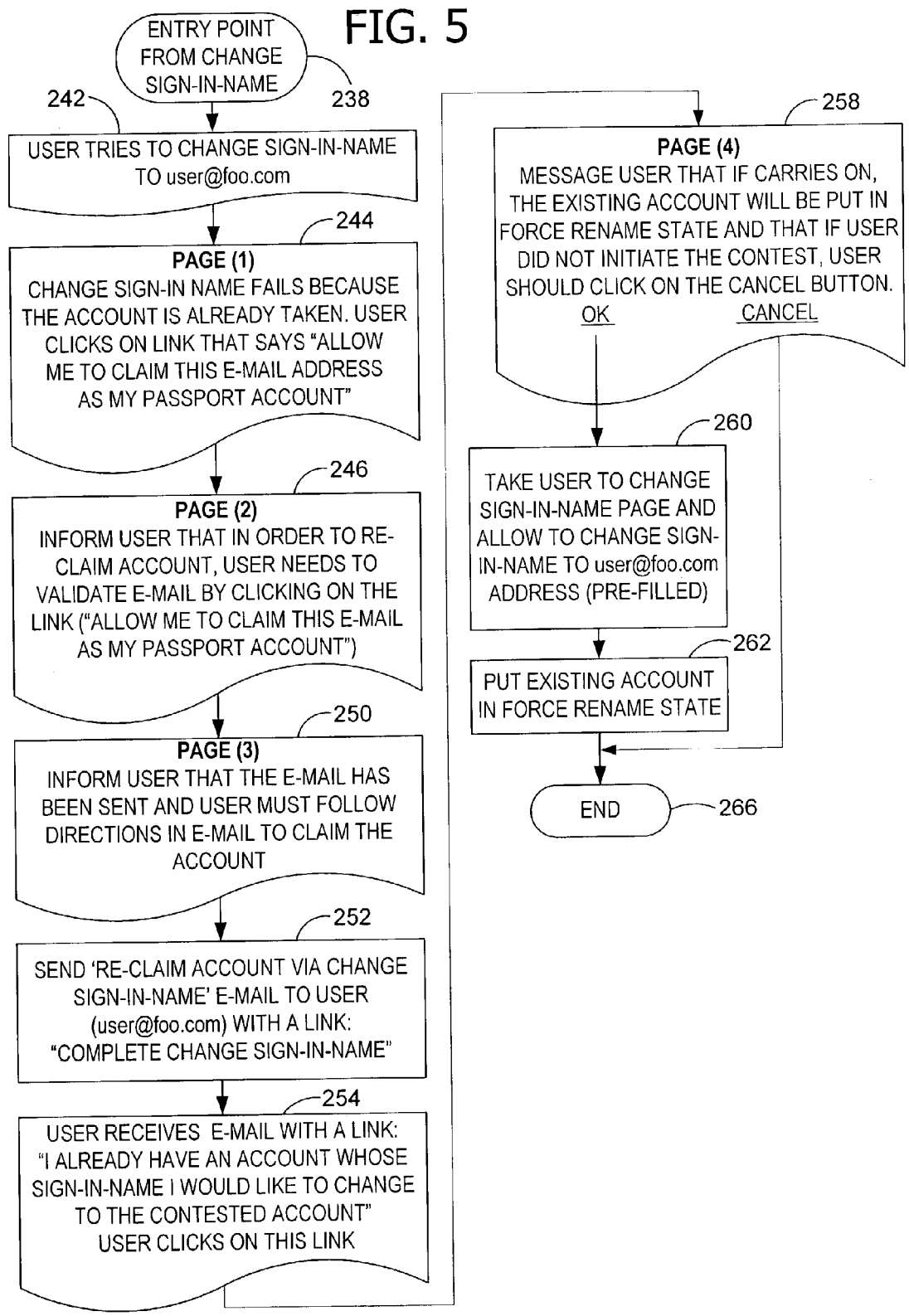
FIG. 5 is an exemplary flow diagram illustrating change sign-in name flow according to one embodiment of the invention.

Referring now to FIG. 5, an exemplary flow diagram illustrates change sign-in name flow according to the invention. In this embodiment, a "change member name" feature accomplishes re-claiming a hijacked login ID. The operation at 238 provides an entry point from change sign-in name. At 242, the user tries to change his or her sign-in name to, for example, user@f.com. In this instance, the requested sign-in name change fails at 244 because the account is already taken. Proceeding to 246, the system informs the user that his or her e-mail address must be validated before the user can re-claim the account. Proceeding to 250, the authentication system provides additional instructions to the user. The process flow continues to 252 and 254 at which the user learns of the steps needed to claim the account with the changed sign-in name. At 258, the process involves notifying the user that continuing the name change will cause the existing account to be placed in a ForceRename state. The process at 260 takes the user to a change sign-in name page and allows the user to change his or her login ID to user@f.com (pre-filled). At 262, the existing account is placed in the ForceRename state. Operations end at 266.

The user can also enter the re-claim process from Member Services, which provides a link on the edit profile page (e.g., "Re-claim a hijacked account") advertising to those users who created a different account (or did not create an account at all) that they can now use this feature to register with their respective e-mail addresses. If a user clicks on this link, the system shows a page explaining that this process allows the user to register with his or her own an e-mail address. In order to get more information, a link leads the user to the help topic that explains in detail how the process works. The help topic has links to the registration entry point as well as the change sign-in name entry point.

Figure 6:
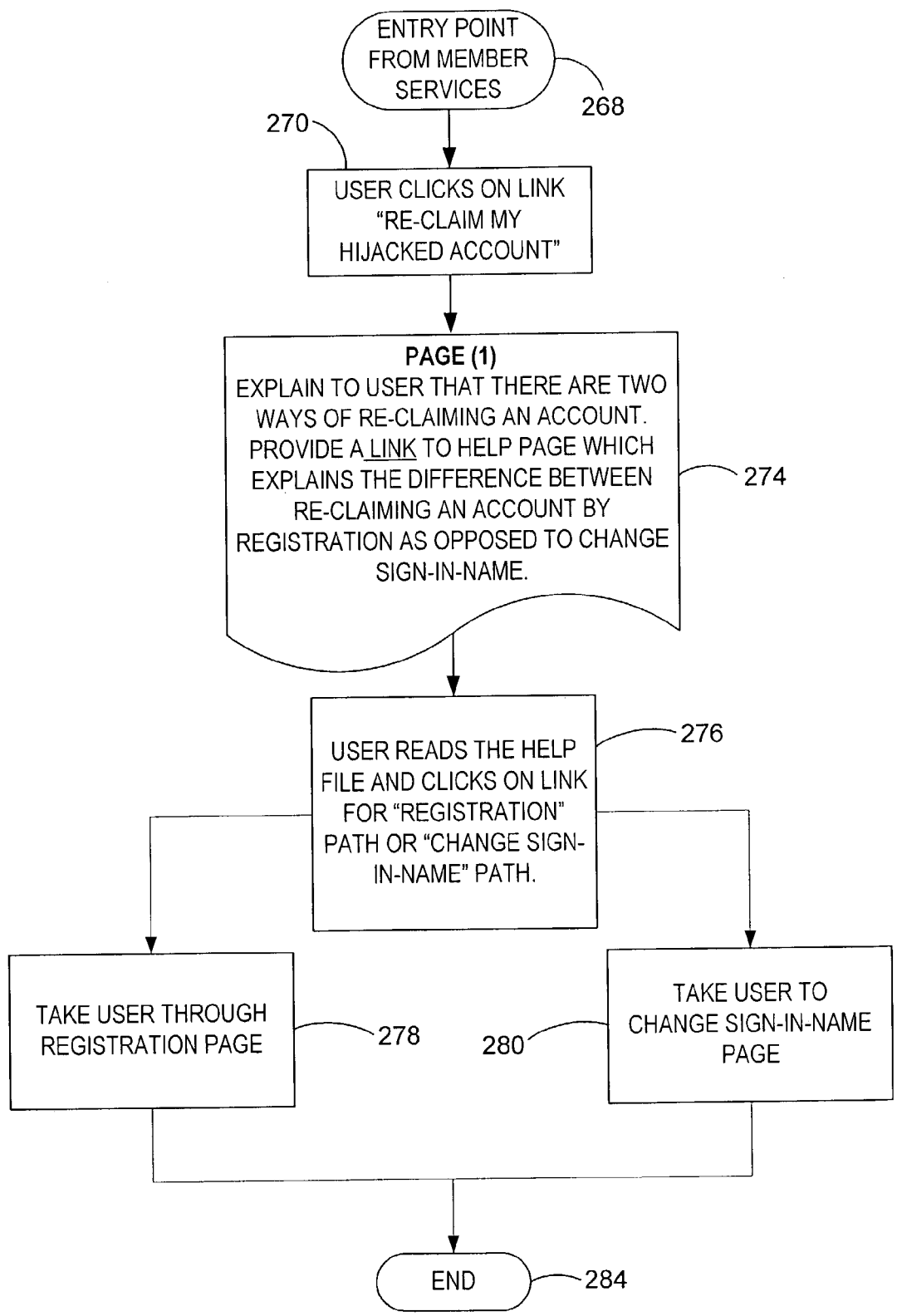
FIG. 6 is an exemplary flow diagram illustrating member services flow according to one embodiment of the invention.

FIG. 6 is an exemplary flow diagram illustrating member services flow according to one embodiment of the invention. Entry point from member services begins at 268. At 270, the user clicks on a link to "re-claim my hijacked account". The process at 274 explains to the user that there are two ways of re-claiming an account. A help page explains the difference between re-claiming an account by registration as opposed to a change sign-in name process. After reading the information at 276, the user selects whether to proceed via the registration page at 278 or the change sign-in name page at 280. Operations end at 284.

The user whose credentials are successfully contested must be notified of the need to change credential name. Ideally, this occurs as soon as the authentication system updates its database. However, the user can go for up to 14 days, for example, without being challenged to provide credentials. During this time, the code at each affiliate site may examine the authentication cookie, but does not give the authentication server an opportunity to verify the credentials. If the user selects persistent login, he or she may never see another login dialog. Thus, a latency period exists from the time the user's credential is moved into the ForceRename state and the time that the user next sees a login prompt. During this latency period, the user can browse to an affiliate site and continue to present the contested e-mail address to the site. However, once an affiliate site decides to refresh the authentication and redirects to the authentication server, the user must be driven through the change credential name process before returning to any affiliate site. In the alternative, the system challenges the user instantaneously to provide credentials.

APPENDIX B provides specific examples of the process for re-claiming a hijacked account.

FIG. 7 shows one example of a general purpose computing device in the form of a computer 70. In one embodiment of the invention, a computer such as the computer 70 is suitable for use in client computer system 162, authentication server 170, or any of affiliate servers 166.

In the illustrated embodiments, computer 70 has one or more processors or processing units 72 and a system memory 74. In the illustrated embodiment, a system bus 76 couples various system components including the system memory 74 to the processors 72. The bus 76 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 70 typically has at least some form of computer readable media. Computer readable media, which include both volatile and nonvolatile media, removable and non-removable media, may be any available medium that can be accessed by computer 70. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can accessed by computer 70. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 74 includes computer storage media in the form of removable and/or non-removable, volatile and/or nonvolatile memory. In the illustrated embodiment, system memory 74 includes read only memory (ROM) 78 and random access memory (RAM) 80. A basic input/output system 82 (BIOS), containing the basic routines that help to transfer information between elements within computer 70, such as during startup, is typically stored in ROM 78. The RAM 80 typically contains data and/or program modules that are immediately accessible to and/or presently being operated on by processing unit 72. By way of example, and not limitation, FIG. 7 illustrates operating system 84, application programs 86, other program modules 88, and program data 90.

The computer 70 may also include other removable/non-removable, volatile/nonvolatile computer storage media. For example, FIG. 7 illustrates a hard disk drive 94 that reads from or writes to non-removable, nonvolatile magnetic media. FIG. 7 also shows a magnetic disk drive 96 that reads from or writes to a removable, nonvolatile magnetic disk 98, and an optical disk drive 100 that reads from or writes to a removable, nonvolatile optical disk 102 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 84, and magnetic disk drive 96 and optical disk drive 100 are typically connected to the system bus 76 by a non-volatile memory interface, such as interface 106.

The drives or other mass storage devices and their associated computer storage media discussed above and illustrated in FIG. 7, provide storage of computer readable instructions, data structures, program modules and other data for the computer 70. In FIG. 7, for example, hard disk drive 94 is illustrated as storing operating system 110, application programs 112, other program modules 114, and program data 116. Note that these components can either be the same as or different from operating system 84, application programs 86, other program modules 88, and program data 90. Operating system 110, application programs 112, other program modules 114, and program data 116 are given different numbers here to illustrate that, at a minimum, they are different copies.

A user may enter commands and information into computer 70 through input devices or user interface selection devices such as a keyboard 120 and a pointing device 122 (e.g., a mouse, trackball, pen, or touch pad). Other input devices (not shown) may include a microphone, joystick, game pad, satellite dish, scanner, or the like. These and other input devices are connected to processing unit 72 through a user input interface 124 that is coupled to system bus 76, but may be connected by other interface and bus structures, such as a parallel port, game port, or a universal serial bus (USB). A monitor 128 or other type of display device is also connected to system bus 76 via an interface, such as a video interface 130. In addition to the monitor 128, computers often include other peripheral output devices (not shown) such as a printer and speakers, which may be connected through an output peripheral interface (not shown).

The computer 70 may operate in a networked environment using logical connections to one or more remote computers, such as a remote computer 134. The remote computer 134 may be a personal computer, a server, a router, a network PC, a peer device or other common network node, and typically includes many or all of the elements described above relative to computer 70. The logical connections depicted in FIG. 7 include a local area network (LAN) 136 and a wide area network (WAN) 138, but may also include other networks. Such networking environments are commonplace in offices, enterprise-wide computer networks, intranets, and global computer networks (e.g., the Internet).

When used in a local area networking environment, computer 70 is connected to the LAN 136 through a network interface or adapter 140. When used in a wide area networking environment, computer 70 typically includes a modem 142 or other means for establishing communications over the WAN 138, such as the Internet. The modem 142, which may be internal or external, is connected to system bus 76 via the user input interface 134, or other appropriate mechanism. In a networked environment, program modules depicted relative to computer 70, or portions thereof, may be stored in a remote memory storage device (not shown). By way of example, and not limitation, FIG. 7 illustrates remote application programs 144 as residing on the memory device. It will be appreciated that the network connections shown are exemplary and other means of establishing a communications link between the computers may be used.

Generally, the data processors of computer 70 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described herein in conjunction with a microprocessor or other data processor. The invention also includes the computer itself when programmed according to the methods and techniques described below.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 70, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 70 executes computer-executable instructions such as those illustrated in the drawings to register users and manage user accounts in an authentication system. Computer 70 first receives a request to create a new user account in connection with a requested login identifier and notifies the new user of a contested registration when the requested login identifier matches one of the login identifiers maintained in an authentication database. Computer 70 then creates a new user account in connection with the requested login identifier and renders inactive the user account corresponding to the matching login identifier. This resolves the contested registration. Further, computer 70 retains the unique account identifier and associated account information for the inactive user account. In another embodiment, computer 70 solicits confirmation from the user when the user requests an e-mail address change matching one of the e-mail addresses maintained in the authentication database. In yet another embodiment, computer 70 places the user account corresponding to the matching e-mail address in a forced rename state to render the user account inactive and cause the user to change the matching e-mail address.

Information in this document, including uniform resource locator and other Internet Web site references, is subject to change without notice. Unless otherwise noted, the example companies, organizations, products, domain names, e-mail addresses, logos, people, places and events depicted herein are fictitious, and no association with any real company, organization, product, domain name, e-mail address, logo, person, place or event is intended or should be inferred.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

Appendix A

User Experience: Contested Credentials

Scenarios and Requirements

All of these scenarios use this cast of characters:
  Joe Doe is the current legitimate owner of an e-mail account with address JDoe@y.com.
  Josephine Doe (known to her friends as "Jo") is the legitimate creator of an EASI authentication account (e.g., a "Passport" from Microsoft®.NET™ Passport single sign-in service) with sign-in name JDoe@y.com. The Passport is referred to as the "contested" Passport.

1.1 E-Mail Owner Discovers Passport Already Registered

Joe is a newbie on the web, having just started with Y e-mail provider, using e-mail account JDoe@y.com.

Josephine Doe has a Passport in the name of JDoe@y.com. Perhaps she once had an e-mail account at Y, but has since moved on to J e-mail, carefully updating her Passport preferred e-mail address to track the change.

Joe decides to get a Passport for easy single sign-on. However, when he tries to create a Passport, he receives an error message "that e-mail address is already registered as a Passport".

Joe gets the response page informing him that the Passport is already registered. He sees text on the page that informs him that Customer Support can rectify this situation for him, provides instructions on how to proceed and a link to Customer Support to make the request.

Following those instructions, Joe sends a Customer Support request, gets a response from a CSR at e-mail address JDoe@y.com, responds to it and receives a confirming e-mail (also at JDoe@y.com) that he can proceed to register the Passport with that address. He is able to complete the process of creating his new Passport in less than a day.

The next time Josephine uses her Passport to log into a site, she gets redirected to the Passport Login page with a new text field informing her that she must change the sign-in name for her Passport.

Note: If an e-mail address is already taken up, the owner of the e-mail address should be able to register for an EASI account using that e-mail address.

1.2 E-Mail Owner Receives Unsolicited Passport E-Mails

Frank (who is Joe's friend) wants to play a prank on him. He tries to register with JDoe@Y.com but is told that the e-mail name already exists (because Joe already owns the e-mail address). He is given the option to contact customer support. He fills out an e-form that requests contesting the passport with name "JDoe@Y.com".

Joe, in the meantime, is using his e-mail account JDoe@y.com. He receives an unsolicited e-mail from Passport asking him to verify his e-mail address. Joe does not reply to this e-mail because he thinks this is a bug. Joe carries on using his account as usual.

Note: Irrespective of who initiates the contest, a legitimate owner should not lose control of his account.

1.3 Attempt to Create New Passport While a Prior Contest is Unresolved ("Cascaded Contest")

Josephine starts with JDoe@y.com. Joe gains control of the e-mail address and contests Josephine's Passport. He now has Passport sign-in JDoe@y.com, but Josephine has not yet selected a new sign-in name for her Passport.

Time passes. A new player, Jack Doe, assumes ownership of JDoe@y.com and attempts to create a new Passport. He, like Joe, is given the option of contacting Customer Support and contesting the sign-in name. It has been quite a while since Josephine's account has been in a limbo state. When he contacts Support, the CSR deletes Josephine's account and the next time Josephine tries to sign-in (if ever), she is forced to create a new account. Jack can register for the account JDoe@y.com. When Joe signs in, he is required to change his sign-in name.

Note: Avoid un-needed complexity in code by allowing at most one account to be in a state where they must be forced to change their sign in name.

1.4 E-Mail Templates

There are multiple e-mails that are generated. For example:
  i) Contest Initiation response: This is the e-mail sent in reply to someone who initiates a contest.
  ii) Contest Delayed response: Generated when a user initiates a contest but responds to the "Contest Initiation response" only after the five day window has passed.
  iii) Contest Affirmation: Generated when a user who has not initiated a contest but gets the "Contest Initiation Response" e-mail either because someone wants to play a prank or someone is makes mistakenly contests an e-mail address they do not own.
  iv) Cascaded contest delay response: Generated when the cascaded contest scenario occurs and as a result of resolving the contest, the CSR would violate the five day delay in deleting a user's account that may already be in Force Rename state.
  v) Contest Successful Response: Generated when a contest is successfully resolved and the CSR informs the winner of the contest that they may register for the account they contested.

1.4.1 Contest Initiation Response

When a CSR receives a request to contest an e-mail name, he/she sends an e-mail is to the user's e-mail address (as specified in the E-form):

Dear Sir/Madam,

Thank you for your interest in Passport and contacting us. You have requested to contest an e-mail address that is currently used by someone else. In order to assist you, you must reply to this e-mail by typing "This e-mail address belongs to me and I would like to register with this e-mail account". Once we receive the reply, we will be able to further assist you.

If you received this e-mail without requesting it, please delete it and accept our apologies.

When the CSR receives the e-mail reply, they must use their judgment to make sure that the user really wants to contest the e-mail address. Users may not type in the exact phrase that the e-mail template asked them to type in. If it is not clear that the user wants to contest the e-mail, they should reply to the e-mail and ask for explicit confirmation.

It is possible that when a user replies to this e-mail, it may be the legitimate owner of the e-mail address who never initiated the contest. In such a case, the CSR must ignore this e-mail and reject the attempt to contest the Passport.

1.4.2 Contest Delayed Response

If a contest is initiated and a CSR responds to them with the "Contest Initiation response", the person who initiated the contest must respond within 5 days. If they respond after 5 days, CSR will respond to their response with the following e-mail template:

Dear Sir/Madam,

Thank you for replying to the e-mail I sent earlier. However, in the interests of security, we cannot complete the process to change e-mail addresses if someone does not respond to us within five days.

If you would like to contest this e-mail address, please go to the registration page and try registering with this e-mail address. If the registration attempt fails, you will be shown a link to "Contact Us". Please click on that link and follow the steps.

Thank you for your understanding.

1.4.3 Contest Affirmation

It may happen that someone initiates a contest as a prank or by mistake for an e-mail that they do not own. The rightful e-mail owner will get the "Contest Initiation response". They may reply to it asking what the mail is about. If this happens, the CSR will respond with an e-mail educating the user that their account is not threatened in any way and their profile will be maintained. The e-mail also tells them that if they did not initiate the contest, they need not do anything else.

Dear Passport User,

Thank you for your response to our e-mail. We regret to inconvenience you but someone claimed that the e-mail address belonged to them and in order to confirm their claim, we needed to send the e-mail you received.

Please accept our apologies. Your account is in no way affected and you can continue to enjoy the privileges of your passport account.

Thank you for using Passport.

1.4.4 Cascaded Contest Delay Response

Due to the Cascaded scenario, it may happen that someone initiates a contest for an e-mail account for which there is an existing account in the ForceRename state. In the rare event that both contests happen within 5 days of each other, the second contestant will be sent an e-mail stating that they must wait for X (where X is the number of days that would give the account owner in the ForceRename state 5 days to change their sign-in name) days before they may be able to register. This is done as soon as the CSR receives the request to initiate the contest. This is done to ensure that the account in the ForceRename state has some time to rename their Passport.

Dear Sir/Madam,

Thank you for confirming that the e-mail address you tried to register for really belongs to you. Due to some limitations in the Passport system, we will not be able to allow you to register with this e-mail for X more days. We apologize for the inconvenience. After X days, we will send you e-mail informing you that you will be able to register with this e-mail address.

Thank you for your interest in Passport.

1.4.5 Contest Successful Response

When the CSR confirms that the e-mail he received in reply is from the e-mail account that is in question, he/she will reply with the following e-mail:

Dear Sir/Madam,

Thank you for contacting customer support regarding your registration. We apologize for the inconvenience that you were put through. You may now register with the e-mail address:{e-mail address}.

Please do so immediately so that no one else registers with that e-mail address.

Please let us know if we can be of further assistance. Thank you for using Passport.

Appendix B

User Experience: Re-Claim Hijacked Account

Scenarios and Requirements

Scenario (i): Re-claim through registration: Josephine Doe has a Passport in the name of JDoe@y.com but does not own the e-mail address JDoe@Y.com.

Joe is a newbie on the web, having just started with Y e-mail provider, using e-mail account JDoe@y.com. Joe decides to get a Passport for easy single sign-on. However, when he tries to create a Passport, he receives an error message "that e-mail address is already registered as a Passport".

There is a link that takes him to a page that explains a process whereby he can initiate a "contest" to register his Passport account with the e-mail address that he owns.

Joe follows this process, receives and responds to an e-mail message and completes the process of creating his new Passport in less than an hour.

The next time Josephine uses her Passport to log into a site, she gets redirected to the Passport Login page with a new text field informing her that she must change the sign-in name for her Passport.

Note: Owner of an e-mail address is always able to create an EASI Passport with that address.

Scenario (ii): Re-claim hijacked account by changing sign-in name: Mary has two e-mail accounts: Mary@y.com and Mary@f.com. She tries to register for an account Mary@y.com. She finds that it is already taken so she uses her second e-mail address (i.e., Mary@f.com) to register for a Passport account. Time passes. Now Mary finds that when she goes to member services, there is an option to "re-claim hijacked account". She clicks on the link and is told that she will receive an e-mail message and that she should follow the directions in the e-mail to get her account back. She accepts. When she gets the e-mail, there is a link that allows her to change her sign-in name from Mary@f.com to Mary@y.com. She clicks on the link and is allowed to change her sign-in name to Mary@y.com. The owner of the account who signed up with Mary@y.com (without really owning the e-mail address) is forced to change her sign-in name the next time she signs in.

Note: Ability for users to keep their PUID while re-claiming a hijacked account.

Scenario(iii): Re-claim through Member Services: Tony is the owner of the e-mail address Tony@e.net. A few months ago, he tried to register for an account with that e-mail address but could not because it was already taken. So he decided to create a Passport account with the sign-in name TonyJones@e.net even though he does not own the e-mail. Time passes. One day while looking at the Member Services page, he notices a link that says "Re-claim my account". Out of curiosity, he clicks on the link. This brings up a page that leads him to a help page that explains the concept of re-claiming a hijacked account. He follows the help link to change sign-in name and by following the directions, he is able to change his sign-in name to Tony@e.net. The previous owner of Tony@e.net is forced to change his sign-in name the next time he tries to sign-in.

Note: Ability to enter the re-claiming process through multiple entry points.

Scenario (iv): Old user forced to change sign-in name: Josephine visits Messenger. Unknown to her, someone else successfully re-claimed her sign-in name JDoe@y.com. When she returns to Messenger, she finds she still cannot get in, she is blocked by a "Sign-in failed" popup. This reminds Josephine that she is now using J e-mail service, so she goes back to Passport, changes her sign-in name to JDoe@j.com, and succeeds in accessing Messenger.

Note: Owner of existing Passport is always able to access it

Scenario (v): Real user of e-mail receives unsolicited "re-claim" e-mail: Joe is using his e-mail account JDoe@y.com and is the owner of the Passport account with that name. He receives an unsolicited e-mail from Passport informing him that in order to do a successful contest, he must click a link. Joe does not know anything about this, and suspects it is part of a marketing scam, virus, or merely a bug. He deletes the e-mail. There is no effect on his account.

Note: Correct owner of e-mail address should not have to do anything if someone tries to contest the e-mail account.

1.5 E-Mail Templates

There will be two e-mail templates created as a result of this feature. Both e-mail templates are distinct from the validation e-mail that is sent when someone registers for a new account.

1.5.1 Re-Claim Mail for Registration Flow

Addressed to: User@f.com

Thank you for contacting Microsoft Passport. Our records indicate that you have chosen to re-claim a hijacked account (i.e., someone registered for a Passport account with your e-mail address). In order for us to let you register for this account, we need to verify that you are the true owner of the e-mail address user@f.com.

Please click here if you initiated this process and wish to register your account with this e-mail address.

If you did not initiate this process, please accept our apologies and delete this e-mail.

1.5.2 Re-Claim Mail for Change Sign-in Name Flow

Addressed to: User@f.com

Thank you for contacting Passport. Our records indicate that you have chosen to re-claim a hijacked account (i.e. someone registered for a Passport account with your e-mail address). In order for us to let you change your sign-in name to this e-mail address, we need to verify that you are the true owner of the e-mail address user@f.com.

Please click here if you initiated this process and wish to change your sign-in name to this e-mail address.

If you did not initiate this process, please accept our apologies and delete this e-mail.

There will be no "Cancel" links on either of these templates.

What is claimed is:

1. A method of registering users in an authentication system, said authentication system including an authentication server and an authentication database associated therewith, said authentication server being coupled to a data communication network and authenticating registered users when login information from the registered users retrieved via the data communication network matches authentication credentials maintained in the authentication database, said credentials including login identifiers corresponding to user accounts of the registered users, said user accounts each being identified by a unique account identifier assigned thereto, said method comprising:

receiving a request to create a new user account in connection with a requested login identifier, said request to create the new user account being received at the authentication server from a new user via a client computer also coupled to the data communication network;

notifying the new user of a contested registration when the requested login identifier matches one of the login identifiers maintained in the authentication database;

creating the new user account in connection with the requested login identifier for the new user and rendering inactive the user account corresponding to the matching login identifier to resolve the contested registration; and retaining the unique account identifier and associated account information for the inactive user account.

2. The method of claim 1 further comprising comparing the requested login identifier with the login identifiers maintained in the authentication database to determine whether the requested login identifier is already associated with the user account of one of the registered users.

3. The method of claim 1 wherein the new user account and one or more existing user accounts of the registered users comprise EASI accounts.

4. The method of claim 1 wherein the requested login identifier comprises an electronic mail address.

5. The method of claim 4 wherein notifying the new user of the contested registration comprises sending an e-mail to the electronic mail address of the requested login identifier.

6. The method of claim 5 further comprising requesting confirmation from the new user that the electronic mail address of the requested login identifier belongs to the new user, said confirmation being requested via the e-mail sent to the electronic mail address of the requested login identifier.

7. The method of claim 6 wherein the confirmation comprises a reply from the new user via return e-mail to confirm that the electronic mail address of the requested login identifier belongs to the new user.

8. The method of claim 5 further comprising receiving said confirmation from the new user at the authentication server and wherein rendering inactive the user account corresponding to the matching login identifier is responsive to the confirmation being received.

9. The method of claim 5 wherein the e-mail includes a hyperlink to a registration page at the authentication server for continuing registration of the new user.

10. The method of claim 1 wherein the credentials maintained in the authentication database include a password associated with each of the login identifiers and further comprising distinguishing the new user account from the inactive user account corresponding to the matching login identifier based on the respective passwords.

11. The method of claim 10 wherein distinguishing the new user account from the inactive user account comprises comparing lengths and first and last characters of the respective passwords.

12. The method of claim 1 wherein rendering inactive the user account corresponding to the matching login identifier includes placing the user account in a forced rename state to cause the registered user to change the matching login identifier associated with the user account before permitting the inactive user account to become active again.

13. The method of claim 12 further comprising deleting the inactive user account in the forced rename state if another new user intervenes to request a new user account in connection with the same requested login identifier before the registered user changes the matching login identifier associated with the user account.

14. The method of claim 1 further comprising storing a plurality of credentials in the authentication database, each set of said credentials being used to register one of the users with the authentication system and to subsequently authenticate the respective one of the users.

15. The method of claim 1 wherein one or more computer-readable media have computer-executable instructions for performing the method of claim 1.

16. An authentication system comprising:
an authentication server coupled to a data communication network;
an authentication database associated with the authentication server; and
said authentication server being configured to authenticate registered users when login information from the registered users retrieved via the data communication network matches authentication credentials maintained in the authentication database, said credentials including login identifiers corresponding to user accounts of the registered users, said user accounts each being identified by a unique account identifier assigned thereto, said authentication server further being configured to receive a request to create a new user account in connection with a requested login identifier, said request to create the new user account being received at the authentication server from a new user via a client computer also coupled to the data communication network, said authentication server further being configured to notify the new user of a contested registration when the requested login identifier matches one of the login identifiers maintained in the authentication database, create the new user account in connection with the requested login identifier for the new user, render inactive the user account corresponding to the matching login identifier for resolving the contested registration, and retain the unique account identifier and associated account information for the inactive user account.

17. The system of claim 16 wherein the requested login identifier is compared with the login identifiers maintained in the authentication database to determine whether the requested login identifier is already associated with the user account of one of the registered users.

18. The system of claim 16 wherein the new user account and one or more existing user accounts of the registered users comprise EASI accounts.

19. The system of claim 16 wherein the requested login identifier comprises an electronic mail address.

20. The system of claim 19 wherein the authentication server notifies the new user of the contested registration via an e-mail to the electronic mail address of the requested login identifier.

21. The system of claim 20 wherein the authentication server receives confirmation from the new user that the electronic mail address of the requested login identifier belongs to the new user via return e-mail from the new user.

22. The system of claim 21 wherein the authentication server is responsive to the return e-mail confirmation for rendering inactive the user account corresponding to the matching login identifier.

23. The system of claim 20 wherein the e-mail includes a hyperlink to a registration page at the authentication server for continuing registration of the new user.

24. The system of claim 16 wherein the credentials maintained in the authentication database include a password associated with each of the login identifiers and wherein the authentication server distinguishes the new user account from the inactive user account corresponding to the matching login identifier based on the respective passwords.

25. The system of claim 24 wherein the authentication server compares lengths and first and last characters of the respective passwords to distinguish the new user account from the inactive user account.

26. The system of claim 16 wherein the authentication server defines a forced rename state for the user account in which the registered user must change the matching login identifier associated with the user account before the inactive user account can become active again.

27. The system of claim 16 wherein the authentication database stores a plurality of credentials and wherein the authentication server uses each set of said credentials to register one of the users with the authentication system and to subsequently authenticate the respective one of the users.

28. A method of managing user accounts in an authentication system, said authentication system including an authentication server and an authentication database associated therewith, said authentication server being coupled to a data communication network and authenticating users when login information from the users retrieved via the data communication network matches authentication credentials maintained in the authentication database, said credentials including e-mail addresses corresponding to the user accounts of the users, said user accounts each being identified by a unique account identifier assigned thereto, said method comprising:
receiving a request from one of the users to change the e-mail address associated with the user account of the requesting user, said request being received at the authentication server from the requesting user via a client computer also coupled to the data communication network;

soliciting confirmation from the requesting user that the requested e-mail address belongs to the requesting user when the requested e-mail address matches one of the e-mail addresses maintained in the authentication database, said confirmation being solicited via an e-mail sent to the requested e-mail address;

rendering inactive the user account corresponding to the matching e-mail address; and retaining the unique account identifier and associated account information for the inactive user account.

29. The method of claim 28 further comprising comparing the requested e-mail address with the e-mail addresses maintained in the authentication database to determine whether the requested e-mail address is already associated with the user account of another one of the users.

30. The method of claim 28 wherein the user accounts comprise EASI accounts.

31. The method of claim 28 wherein the confirmation comprises a reply from the requesting user via return e-mail to confirm that the requested e-mail address belongs to the requesting user.

32. The method of claim 31 further comprising receiving said confirmation from the requesting user at the authentication server and wherein rendering inactive the user account corresponding to the matching e-mail address is responsive to the confirmation being received.

33. The method of claim 28 wherein the credentials maintained in the authentication database include a password associated with each of the e-mail addresses and further comprising distinguishing the user accounts corresponding to the matching e-mail addresses based on the respective passwords.

34. The method of claim 33 wherein distinguishing the user accounts comprises comparing lengths and first and last characters of the respective passwords.

35. The method of claim 28 wherein rendering inactive the user account corresponding to the matching e-mail address includes placing the user account in a forced rename state to cause the user of the inactive user account to change the matching e-mail address associated with the user account before permitting the inactive user account to become active again.

36. The method of claim 28 wherein one or more computer-readable media have computer-executable instructions for performing the method of claim 28.

37. A method of managing user accounts in an authentication system, said authentication system including an authentication server and an authentication database associated therewith, said authentication database storing authentication credentials including e-mail addresses corresponding to the user accounts of a plurality of users, said user accounts each being identified by a unique account identifier assigned thereto, said method comprising:

receiving, at the authentication server, a request from one of the users to associate an e-mail address with the user account of the requesting user;

notifying the requesting user of a contested registration when the requested e-mail address matches one of the e-mail addresses stored in the authentication database;

soliciting confirmation from the requesting user that the requested e-mail address belongs to the requesting user, said confirmation being solicited via an e-mail sent to the requested e-mail address;

placing the user account corresponding to the matching e-mail address in a forced rename state to render the user account inactive and to cause the user of the inactive user account to change the matching e-mail address associated therewith before permitting the inactive user account to become active again; and retaining the unique account identifier and associated account information for the inactive user account.

38. The method of claim 37 further comprising comparing the requested e-mail address with the e-mail addresses stored in the authentication database to determine whether the requested e-mail address is already associated with the user account of another one of the users.

39. The method of claim 37 wherein the user accounts comprise EASI accounts.

40. The method of claim 37 wherein the confirmation comprises a reply from the requesting user via return e-mail to confirm that the requested e-mail address belongs to the requesting user.

41. The method of claim 40 further comprising receiving said confirmation from the requesting user at the authentication server and wherein placing the user account corresponding to the matching e-mail address into the forced rename state is responsive to the confirmation being received.

42. The method of claim 37 wherein the authentication database stores a password associated with each of the e-mail addresses and further comprising distinguishing the user accounts corresponding to the matching e-mail addresses based on the respective passwords.

43. The method of claim 42 wherein distinguishing the user accounts comprises comparing lengths and first and last characters of the respective passwords.

44. The method of claim 37 wherein the e-mail sent to the requested e-mail address includes a hyperlink to a registration page at the authentication server for registration of the requesting user.

45. The method of claim 37 wherein one or more computer-readable media have computer-executable instructions for performing the method of claim 37.

* * * * *